US011346569B2

(12) United States Patent
Wang et al.

(10) Patent No.: US 11,346,569 B2
(45) Date of Patent: May 31, 2022

(54) METHOD AND APPARATUS FOR CONTROLLING DEVICE

(71) Applicant: Qingdao Haier Air-Conditioning Electronic Co., Ltd., Shandong (CN)

(72) Inventors: Jun Wang, Shandong (CN); Shaojiang Cheng, Shandong (CN); Baitian Zhuo, Qingdao (CN); Ruigang Zhang, Qingdao (CN); Bin Shi, Shandong (CN)

(73) Assignee: QINGDAO HAIER AIR-CONDITIONING ELECTRONIC CO., LTD., Shandong (CN)

( * ) Notice: Subject to any disclaimer, the term of this patent is extended or adjusted under 35 U.S.C. 154(b) by 96 days.

(21) Appl. No.: 16/780,469

(22) Filed: Feb. 3, 2020

(65) Prior Publication Data
US 2020/0173677 A1 Jun. 4, 2020

Related U.S. Application Data

(63) Continuation-in-part of application No. PCT/CN2018/096154, filed on Jul. 18, 2018.

(30) Foreign Application Priority Data

Aug. 2, 2017 (CN) .......................... 201710650458.5

(51) Int. Cl.
*F24F 11/32* (2018.01)
*F24F 11/64* (2018.01)
*G01K 13/00* (2021.01)

(52) U.S. Cl.
CPC .............. *F24F 11/32* (2018.01); *F24F 11/64* (2018.01); *G01K 13/00* (2013.01); *G01K 2201/00* (2013.01)

(58) Field of Classification Search
CPC .. F24F 11/32; F24F 11/64; F24F 11/49; F24F 2110/10; F24F 11/38; F24F 11/30;
(Continued)

(56) References Cited

U.S. PATENT DOCUMENTS 5,115,643 A * 5/1992 Hayata .................... F25B 13/00
62/115
7,319,926 B2 * 1/2008 Suzuki .................. F02D 41/062
701/29.1
(Continued)

FOREIGN PATENT DOCUMENTS

| CN | 1755341 A | 4/2006 |
| CN | 1959262 A | 5/2007 |

(Continued)

OTHER PUBLICATIONS

Search Report from Chinese Application No. 2017106504585 dated Dec. 3, 2019.
(Continued)

*Primary Examiner* — Darrin D Dunn
(74) *Attorney, Agent, or Firm* — Calfee, Halter & Griswold LLP

(57) ABSTRACT

The present disclosure discloses a method and an apparatus for controlling a device. The method is applied in an indoor unit of a multi-split system and includes: when a temperature sensor fails, selecting other indoor units operating in the same operation mode with a current indoor unit from all indoor units; obtaining corresponding sensor parameters from temperature sensors of the indoor units operating in the same operation mode; and controlling the device according to the obtained sensor parameters.

5 Claims, 3 Drawing Sheets

(58) Field of Classification Search
CPC ..... F24F 11/54; G01K 13/00; G01K 2201/00; F25B 2313/029; G05B 23/0221; G05B 23/0286; G05B 19/4184; G05B 2219/2614; G05B 2219/33331; G05B 2219/35001; G05B 2219/24053; G05B 2219/37325

See application file for complete search history.

(56) References Cited

U.S. PATENT DOCUMENTS

| | | | | |
|---|---|---|---|---|
| 7,809,472 | B1* | 10/2010 | Silva | F24F 3/065 700/277 |
| 8,965,734 | B2 | 2/2015 | Albsmeier | G01M 15/046 702/183 |
| 9,766,993 | B2* | 9/2017 | Agrawal | H04L 67/12 |
| 2008/0133149 | A1* | 6/2008 | Ponziani | G01M 15/14 702/45 |
| 2009/0281667 | A1* | 11/2009 | Masui | F24F 11/30 700/276 |
| 2011/0154834 | A1* | 6/2011 | Choi | F25B 49/005 62/56 |
| 2018/0095483 | A1* | 4/2018 | Tokudi | F24F 11/62 |
| 2020/0073401 | A1* | 3/2020 | Szatmary | B60T 7/00 |

FOREIGN PATENT DOCUMENTS

| | | |
|---|---|---|
| CN | 101487650 A | 7/2009 |
| CN | 101504178 A | 8/2009 |
| CN | 101504179 A | 8/2009 |
| CN | 101504180 A | 8/2009 |
| CN | 101589273 A | 11/2009 |
| CN | 102575884 A | 7/2012 |
| CN | 102679495 A | 9/2012 |
| CN | 202853058 U | 4/2013 |
| CN | 103423833 A | 12/2013 |
| CN | 104296313 A | 1/2015 |
| CN | 104374049 A | 2/2015 |
| CN | 104697113 A | 6/2015 |
| CN | 104697128 A | 6/2015 |
| CN | 105571082 A | 5/2016 |
| CN | 106979597 A | 7/2017 |
| CN | 107490129 A | 12/2017 |
| EP | 0793062 A2 | 9/1997 |
| JP | 2001248878 A | 9/2001 |
| JP | 2008249234 A | 10/2008 |
| JP | 2008309379 A | 12/2008 |
| JP | 2011158171 A | 8/2011 |
| KR | 20070045025 A | 5/2007 |

OTHER PUBLICATIONS

Office Action from Chinese Application No. 201710650458.5 dated May 9, 2020.

Search Report from Euroepan Application No. 18841246.4 dated Jun. 3, 2020.

International Search Report and Written Opinion from International Application No. PCT/CN2018/096154 dated Sep. 25, 2018.

Office Action from Chinese Aplication No. 2017106504585 dated Dec. 3, 2019.

* cited by examiner

METHOD AND APPARATUS FOR CONTROLLING DEVICE

CROSS-REFERENCE TO RELATED APPLICATIONS

This application is a Continuation-in-Part of International Application No. PCT/CN2018/096154, filed Jul. 18, 2018, designating the United States, and claiming the benefit of Chinese Patent Application No. 201710650458.5, filed Aug. 2, 2017, the entire contents of which are incorporated herein by reference.

TECHNICAL FIELD

The present disclosure relates to the field of information processing technologies, and more particularly, to a method and an apparatus for controlling a device.

BACKGROUND

Air conditioners, especially one-to-multiple air conditioners, each indoor unit thereof needs to use parameter values measured by a temperature sensor provided in a refrigeration system of the indoor unit to perform calculation controls or judgments during operation, so as to realize the control of components, such as a compressor, an electronic expansion valve and a fan, according to calculation results or judgment results. If a sensor fails, the indoor unit cannot perform a normal operation control due to lack of necessary temperature parameter values for judgments and calculations. When this happens, the current air conditioner often uses methods of stopping to report errors and waiting for maintenance, thereby affecting the normal use of users.

SUMMARY

In view of this, embodiments of the present disclosure provide a method and an apparatus for controlling a device, which can extend working time of an indoor unit to a certain extent when a temperature sensor of the indoor unit fails.

In a first aspect, an embodiment of the present disclosure provides a method for controlling a device, applied in an indoor unit of a multi-split system, including:

when a temperature sensor fails, selecting other indoor units operating in the same operation mode with a current indoor unit from all indoor units;

obtaining corresponding sensor parameters from temperature sensors of the indoor units operating in the same operation mode; and controlling the device according to the obtained sensor parameters.

In a second aspect, an embodiment of the present disclosure further provides an apparatus for controlling a device, applied in an indoor unit of a multi-split system, including:

a processor; and a memory for storing instructions executable by the processor;

wherein the processor is configured to:

when a temperature sensor fails, select other indoor units operating in the same operation mode with a current indoor unit from all indoor units;

obtain corresponding sensor parameters from temperature sensors of the indoor units operating in the same operation mode; and control the device according to the obtained sensor parameters.

In a third aspect, an embodiment of the present disclosure provides a non-transitory computer-readable storage medium including instructions that, when executed by a processor of an apparatus for controlling a device, cause the apparatus to perform a method including:

when a temperature sensor fails, selecting other indoor units operating in the same operation mode with a current indoor unit from all indoor units;

obtaining corresponding sensor parameters from temperature sensors of the indoor units operating in the same operation mode; and controlling the device according to the obtained sensor parameters.

BRIEF DESCRIPTION OF THE DRAWINGS

To describe the technical solutions in embodiments of the present disclosure or in the prior art more clearly, the following briefly introduces the accompanying drawings needed for describing the embodiments or the prior art. Apparently, the accompanying drawings in the following descriptions are some embodiments of the present disclosure, and for persons of ordinary skill in the art, other drawings can be obtained according to these accompanying drawings without creative effort.

DETAILED DESCRIPTION

In order to better understand technical solutions of the present disclosure, the embodiments of the present disclosure will be described in detail below with reference to the accompanying drawings.

It should be known that the described embodiments are merely part of embodiments of the present disclosure rather than all embodiments. All other embodiments obtained by persons of ordinary skill in the art based on the embodiments of the present disclosure without creative effort shall fall within the protection scope of the present disclosure.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
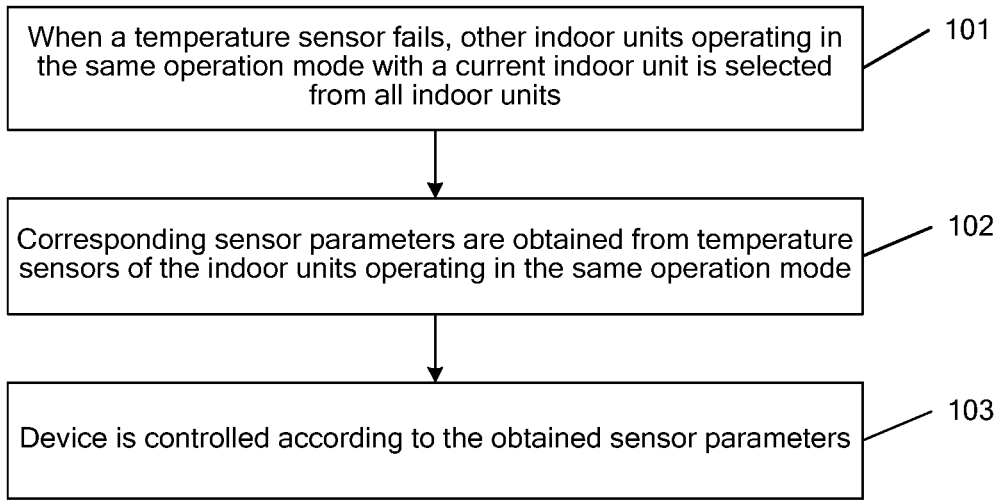
FIG. 1 is a flowchart illustrating a method for controlling a device according to an embodiment of the present disclosure.

The embodiment of the present disclosure provides a method for controlling a device, applied in an indoor unit of a multi-split system and used to maintain an operating state when a temperature sensor in the indoor unit fails, the method shown in FIG. 1 includes the following steps.

101, when a temperature sensor fails, other indoor units operating in the same operation mode with a current indoor unit is selected from all indoor units.

In the embodiment of the present disclosure, there are many kinds of sensors in an indoor unit of an air conditioner, for example, an environment temperature sensor, a coil temperature sensor, a defrosting temperature sensor, and the like.

The failure of the sensor may be that the sensor cannot collect and report data, the reported data is not within a normal parameter range, and the like.

The operation mode includes a cooling mode, a heating mode, an electric auxiliary heating mode, a dehumidification mode, and the like. In the embodiment of the present disclosure, it is only required that a plurality of indoor units operating in the same operation mode have same functions, and there is no limitation on whether the indoor units use the same or similar operating parameters.

102, corresponding sensor parameters are obtained from temperature sensors of the indoor units operating in the same operation mode.

Since a communication bus is generally disposed between multi-split air conditioners for data transmission, temperature sensor parameters of other indoor units can be read through the communication bus.

103, the device is controlled according to the obtained sensor parameters.

In the process of controlling the device, the operating parameters, such as a power of a compressor, an opening degree of an electronic expansion valve, a speed of a fan, and the like, can be adjusted.

According to the method for controlling the device provided by the embodiments of the present disclosure, by reading parameters of a corresponding sensor between indoor units, when a sensor of a certain indoor unit fails, the current indoor unit can be controlled based on the sensor parameters read from other indoor units. Compared with the method in the prior art that the indoor unit needs to be shut down when the sensor fails, the embodiments of the present disclosure can extend the working time of the indoor unit to a certain extent.

Figure 2:
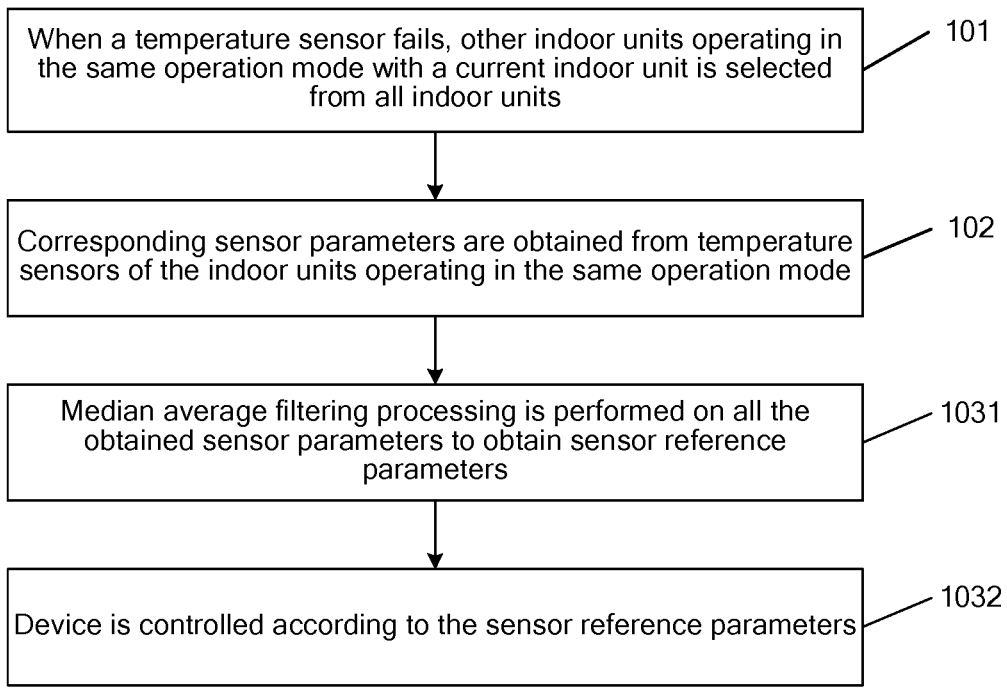
FIG. 2 is a flowchart illustrating a method for controlling a device according to another embodiment of the present disclosure.

Further, since the layout position and operating parameters of the indoor unit may be different to some extent, it is necessary to screen the sensor parameters collected by the indoor unit to a certain extent. Specific implementation of step 103 refers to steps 1031 and 1032 shown in FIG. 2, including:

1031, median average filtering processing is performed on all the obtained sensor parameters to obtain sensor reference parameters.

The median average filtering processing refers to removing the larger and smaller part of data from all the sensor parameters, and then averaging the remaining part.

Since the median average filtering processing needs to perform data screening and mean processing, there are certain requirements on the number of the sensor parameters participating in the median average filtering processing. Based on this requirement, the number of the sensor parameters needs to be obtained before performing step 1031 or step 103; when the number of the sensor parameters exceeds a specified threshold, step 1032 or step 103 is performed; otherwise, the method for controlling the device provided by the embodiment of the present disclosure is not performed, and other methods such as maintaining the current operating state or shutting down are selected.

The specified threshold can be set to an integer of 5, 10, 15, and the like, and the embodiment of the present disclosure does not limit the specific value of the specified threshold.

1032, the device is controlled according to the sensor reference parameters.

The method for controlling the device provided by the embodiment of the present disclosure mainly relates to adjusting the opening degree of the expansion valve according to the obtained sensor reference parameters. Since the sensor reference parameters are taken as the sensor parameters of the current indoor unit in the embodiment of the present disclosure, the related control flow can follow the control method in the prior art, and of course, the related control flow can be reset according to actual needs.

Figure 3:
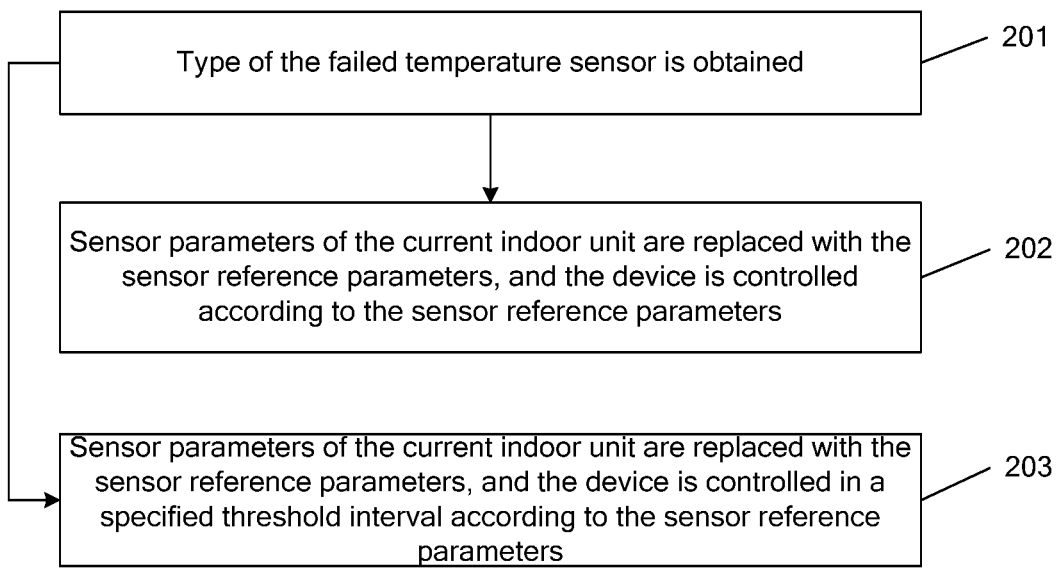
FIG. 3 is a flowchart illustrating a method for controlling a device according to another embodiment of the present disclosure.

Further, since there are many kinds of temperature sensors, when different types of temperature sensors fail, the impact on the operation of the device is also different. Therefore, the embodiment of the present disclosure provides different methods for the implementation of step 1032 when different types of temperature sensors fail. The specific method shown in FIG. 3 includes the following steps.

201, a type of the failed temperature sensor is obtained. When the type of the failed temperature sensor is an environment temperature sensor, step 202 is performed; and when the type of the failed temperature sensor is other temperature sensors, step 203 is performed.

202, sensor parameters of the current indoor unit are replaced with the sensor reference parameters, and the device is controlled according to the sensor reference parameters.

Since indoor and outdoor environments collected by the environment temperature sensors of different indoor units are basically similar, the sensor reference parameters obtained by the median average filtering processing can be basically equivalent to parameters collected by any one of the environment temperature sensors. In this case, the indoor unit in which the environment temperature sensor fails can be directly controlled according to the sensor reference parameters.

203, the sensor parameters of the current indoor unit are replaced with the sensor reference parameters, and the device is controlled in a specified threshold interval according to the sensor reference parameters.

Unlike the environment temperature sensor, other types of temperature sensors (for example, a coil temperature sensor or a defrosting temperature sensor, and the like) are mainly used to collect an internal environment temperature of the indoor unit. Since an internal environment of each indoor unit is relatively independent, it is difficult to be directly replaced with the sensor parameters of other indoor units. Therefore, an adjustable range of the device needs to be limited in the process of controlling the device to avoid damage to the indoor unit. Taking the expansion valve as an example, the adjustable opening degree of the expansion valve needs to be limited to a threshold range, for example, 80 pls to 100 pls.

Figure 4:
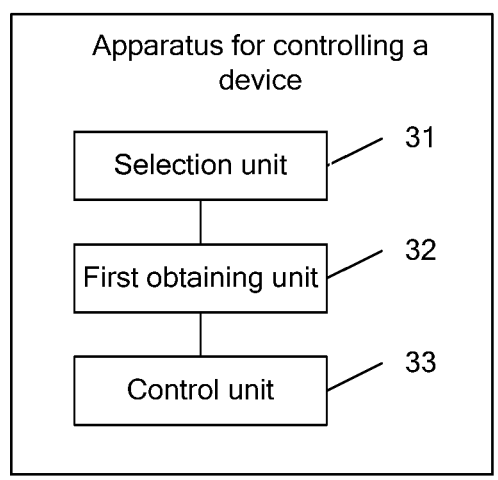
FIG. 4 is a block diagram illustrating an apparatus for controlling a device according to an embodiment of the present disclosure.

The embodiment of the present disclosure further provides an apparatus for controlling a device, applied in an indoor unit of a multi-split system and used to realize the above-mentioned method flows. As shown in FIG. 4, the apparatus for controlling the device includes:

a selection unit 31 configured to, when a temperature sensor fails, select other indoor units operating in the same operation mode with a current indoor unit from all indoor units;

a first obtaining unit 32 configured to obtain corresponding sensor parameters from temperature sensors of the indoor units operating in the same operation mode; and a control unit 33 configured to control the device according to the obtained sensor parameters.

Figure 5:
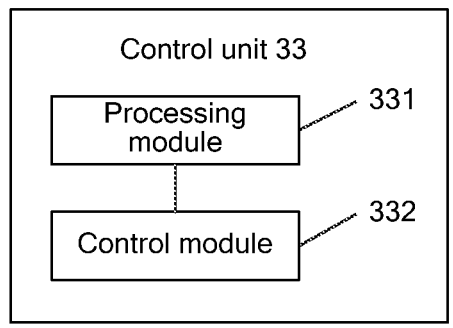
FIG. 5 is a block diagram illustrating an apparatus for controlling a device according to another embodiment of the present disclosure.

Optionally, as shown in FIG. 5, the control unit 33 includes:

a processing module 331 configured to perform median average filtering processing on all the obtained sensor parameters to obtain sensor reference parameters; and a control module 332 configured to control the device according to the sensor reference parameters.

Optionally, the control module 332 is configured to obtain a type of the failed temperature sensor; when the type of the failed temperature sensor is an environment temperature sensor, replace sensor parameters of the current indoor unit with the sensor reference parameters, and control the device according to the sensor reference parameters; and when the type of the failed temperature sensor is other temperature sensors, replace the sensor parameters of the current indoor unit with the sensor reference parameters, and control the device in a specified threshold interval according to the sensor reference parameters.

Optionally, the control unit 33 is specifically configured to adjust an opening degree of an expansion valve according to the obtained sensor parameters.

Figure 6:
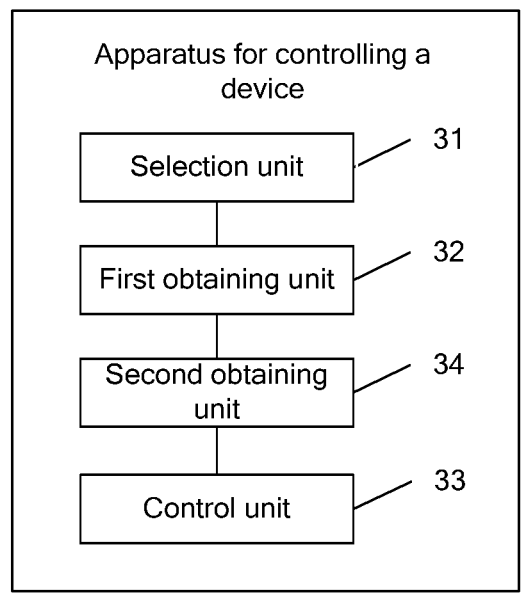
FIG. 6 is block diagram illustrating an apparatus for controlling a device according to another embodiment of the present disclosure.

Optionally, as shown in FIG. 6, the apparatus further includes:

a second obtaining unit 34 configured to obtain the number of the sensor parameters; and the control unit 33 is configured to, when the number of the sensor parameters exceeds a specified threshold, control the device according to the obtained sensor parameters.

According to the apparatus for controlling the device provided by the embodiments of the present disclosure, by reading parameters of a corresponding sensor between indoor units, when a sensor of a certain indoor unit fails, the current indoor unit can be controlled based on the sensor parameters read from other indoor units. Compared with the method in the prior art that the indoor unit needs to be shut down when the sensor fails, the embodiments of the present disclosure can extend the working time of the indoor unit to a certain extent.

It may be understood by persons skilled in the art that for convenience and brevity of description, for a detailed working process of the foregoing system, apparatus, and unit, reference may be made to a corresponding process in the foregoing method embodiments, and details are not described herein again.

In several embodiments provided in the present disclosure, it should be understood that the disclosed apparatus and method can be implemented in other manners. For example, the described apparatus embodiments are merely exemplary. For example, the division of the units is merely a division of logical functions and there can be other division manners during actual implementations. For example, a plurality of units or components can be combined or integrated into another system, or some features can be omitted or not performed. For another, the mutual coupling or direct coupling or a communication connection shown or discussed can be indirect coupling or a communication connection via some interfaces, devices or units, and can be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for controlling a device, applied in an indoor unit of a multi-split system comprising a plurality of indoor units, the method comprising:

when a temperature sensor of a first indoor unit fails, selecting a second indoor unit from other indoor units operating in an operation mode same with that of the first indoor unit;

obtaining corresponding sensor parameters from temperature sensors of the second indoor unit;

obtaining a number of the sensor parameters; and when the number of the sensor parameters exceeds a specified threshold, performing median average filtering processing on all the obtained sensor parameters to obtain sensor reference parameters and controlling at least one of a power of a compressor, an opening degree of an electronic expansion valve, a speed of a fan of the first indoor unit according to the sensor reference parameters, wherein a working time of the first indoor unit is extended.

2. The method according to claim 1, further comprising:

obtaining a type of the failed temperature sensor;

when the type of the failed temperature sensor is an environment temperature sensor, replacing sensor parameters of the first indoor unit with the sensor reference parameters, and controlling the device according to the sensor reference parameters; and when the type of the failed temperature sensor is other temperature sensors, replacing the sensor parameters of the first indoor unit with the sensor reference parameters, and controlling the device in a specified threshold interval according to the sensor reference parameters.

3. An apparatus for controlling a device, applied in an indoor unit of a multi-split system comprising a plurality of indoor units, the apparatus comprising:
- a processor; and
- a memory for storing instructions executable by the processor;
- wherein the processor is configured to:
- when a temperature sensor of a first indoor unit fails, select a second indoor unit from other indoor units operating in an operation mode same with that of the first indoor unit;
- obtain corresponding sensor parameters from temperature sensors of the second indoor unit;
- obtaining a number of the sensor parameters; and
- when the number of the sensor parameters exceeds a specified threshold, perform median average filtering processing on all the obtained sensor parameters to obtain sensor reference parameters and control at least one of a power of a compressor, an opening degree of an electronic expansion valve, a speed of a fan of the first indoor unit according to the sensor reference parameters,
- wherein a working time of the first indoor unit is extended.

4. The device according to claim 3, wherein the processor is further configured to:
- obtain a type of the failed temperature sensor;
- when the type of the failed temperature sensor is an environment temperature sensor, replace sensor parameters of the first indoor unit with the sensor reference parameters, and control the device according to the sensor reference parameters; and
- when the type of the failed temperature sensor is other temperature sensors, replace the sensor parameters of the first indoor unit with the sensor reference parameters, and control the device in a specified threshold interval according to the sensor reference parameters.

5. A non-transitory computer-readable storage medium comprising instructions that, when executed by a processor of an apparatus for controlling a device, cause the apparatus to perform a method applied in an indoor unit of a multi-split system comprising a plurality of indoor units, the method comprising:
- when a temperature sensor of a first indoor unit fails, selecting a second indoor unit from other indoor units operating in an operation mode same with that of the first indoor unit;
- obtaining corresponding sensor parameters from temperature sensors of the second indoor unit;
- obtaining a number of the sensor parameters; and
- when the number of the sensor parameters exceeds a specified threshold, performing median average filtering processing on all the obtained sensor parameters to obtain sensor reference parameters and controlling at least one of a power of a compressor, an opening degree of an electronic expansion valve, a speed of a fan of the first indoor unit according to the sensor reference parameters,
- wherein a working time of the first indoor unit is extended.

* * * * *